Figure 1:
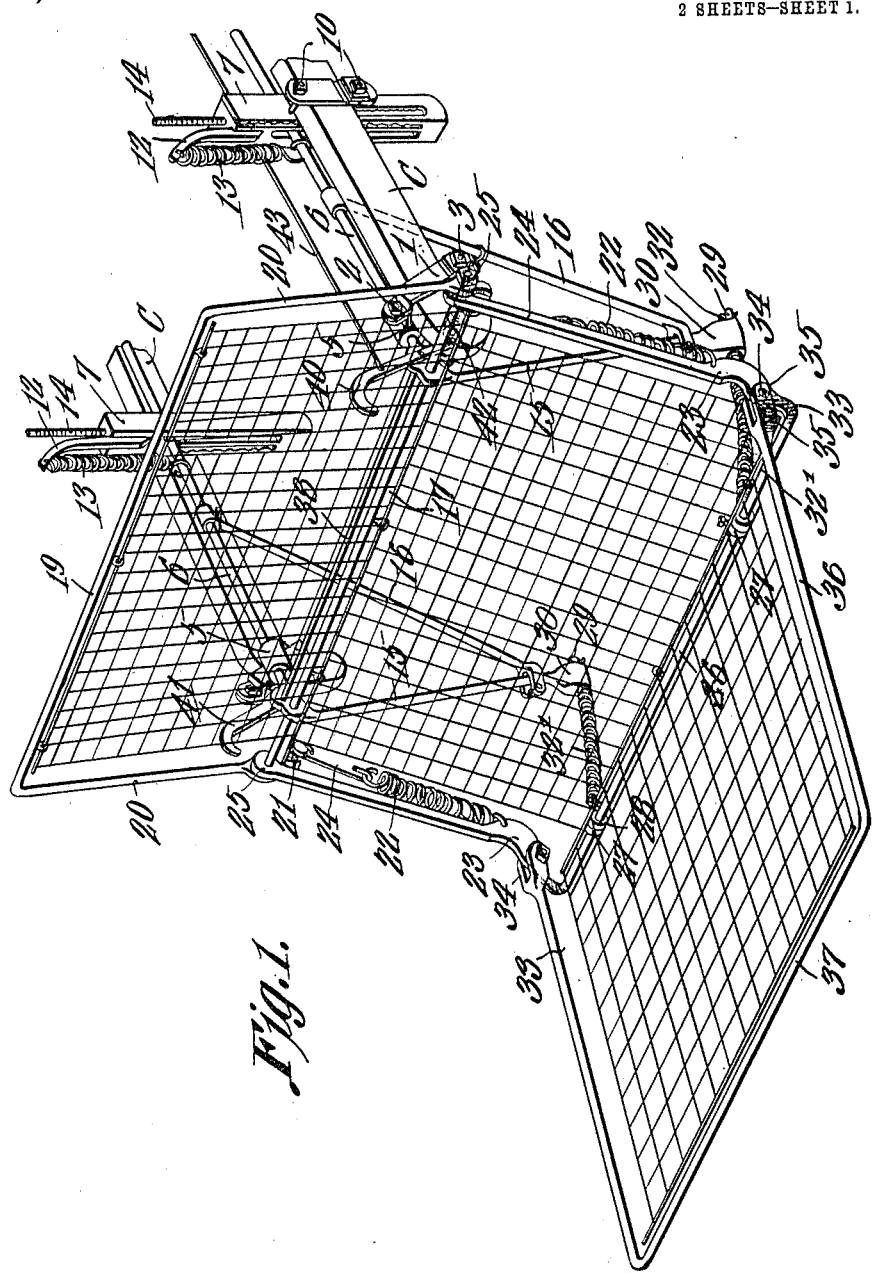

L. R. FLINT.
FENDER.
APPLICATION FILED SEPT. 18, 1912.

1,081,821.

Patented Dec. 16, 1913.
2 SHEETS—SHEET 1.

Lewis R. Flint,
Inventor

Witnesses by C. A. Snow & Co.
Attorneys

L. R. FLINT.
FENDER.
APPLICATION FILED SEPT. 18, 1912.
1,081,821.
Patented Dec. 16, 1913.
2 SHEETS—SHEET 2.
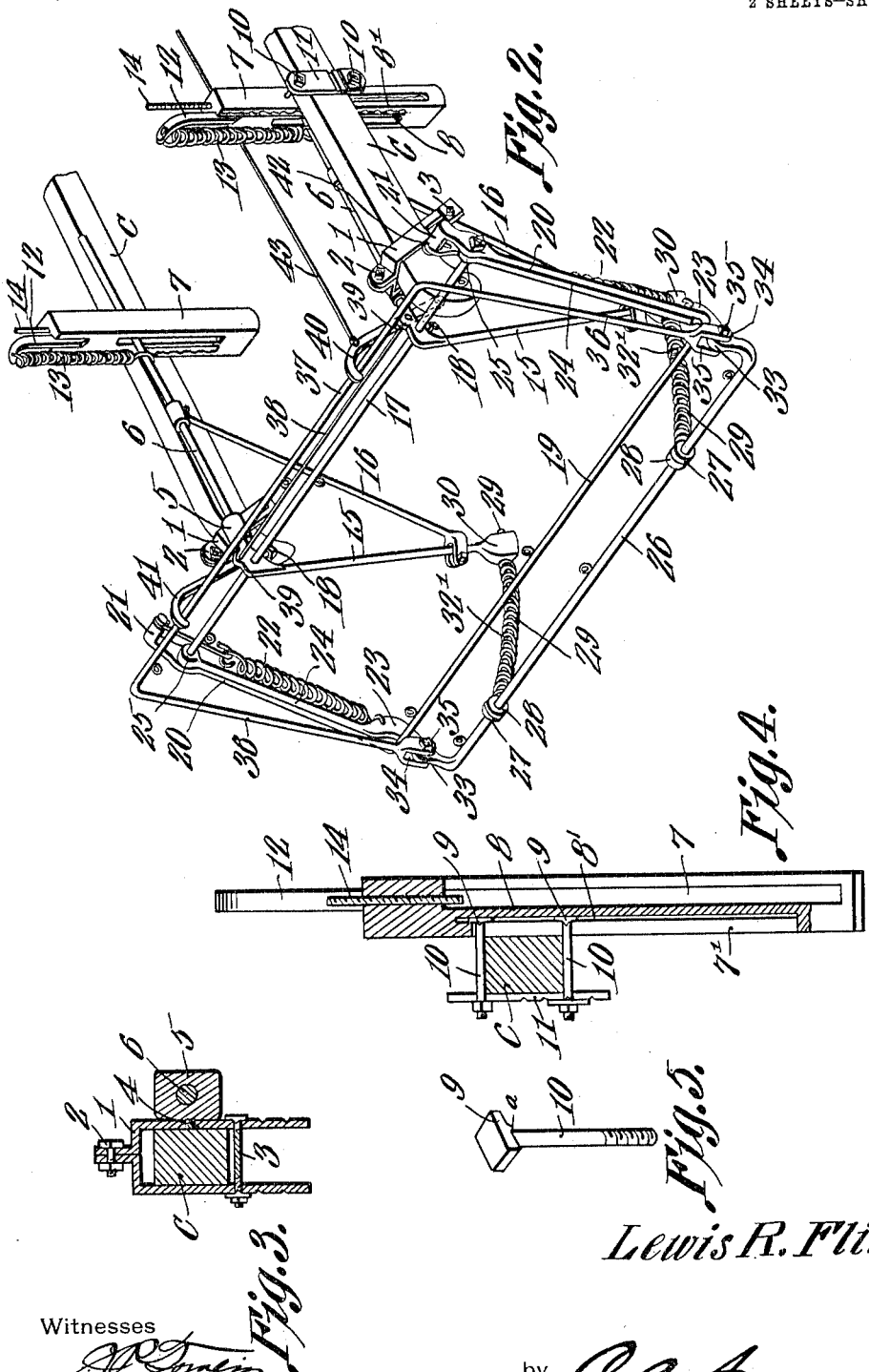
Lewis R. Flint,
Inventor
Witnesses
by C. A. Snow & Co.
Attorneys

UNITED STATES PATENT OFFICE.

LEWIS R. FLINT, OF LANSING, MICHIGAN, ASSIGNOR OF ONE-HALF TO HARVEY E. HILL, OF GALESBURG, MICHIGAN.

FENDER.

1,081,821.  Specification of Letters Patent.  Patented Dec. 16, 1913.

Application filed September 18, 1912. Serial No. 721,089.

*To all whom it may concern:*

Be it known that I, LEWIS R. FLINT, a citizen of the United States, residing at Lansing, in the county of Ingham and State of Michigan, have invented a new and useful Fender, of which the following is a specification.

The present invention relates to improvement in fenders, the primary object of the invention being the provision of an attachment for motor vehicles which is adapted under normal conditions to operate as a bumper or guard to protect the lamps and other fixtures at the forward end of the motor vehicle, and which may be manipulated should the occasion arise to act as a receiving fender.

A further object of the present invention is the provision of a bumper or fender adapted to be connected to the forward end of the chassis of an automobile and so positioned as to be folded to permit ready access to the crank of the engine and which, when released, will act automatically to prevent an object from passing below the car or under the motor and wheels.

A still further object of the present invention is the provision of a fender having three wings, the central wing of which has connected thereto for swinging movement in opposite directions, the remaining two wings, one of which is opened by gravity, while the other one of which is spring actuated, a locking and releasing means being attached for holding the spring opened wing with the gravity opened wing properly folded against the central wing so that the fender, when collapsed, will occupy a smaller space, and whereby the same may be readily extended at will.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the drawings, Figure 1 is a perspective view of the fender in open position, the forward end of a chassis being shown. Fig. 2 is a similar view, the fender being closed, and the fender wings being shown without the usual netting. Fig. 3 is a cross section through one of the adjustable sections for connecting the fender to the chassis. Fig. 4 is a vertical section of the fender guiding means and cushioning means. Fig. 5 is a detail perspective view of one of the bolts used in connecting and securing the sections to the casing, and Fig. 6 is a view taken on line 6—6 of Fig. 3.

Referring to the drawings, C designates the forward end of the chassis, to which are detachably connected the clamps 1, the clamps being composed each of two members connected together at their upper terminals by means of the bolts 2 and adjustably connected at their lower terminals by means of bolts 3, similar to the bolts 10 shown in Figs. 4 and 5.

In order that various width bars C of different makes of automobiles, may have the present invention attached thereto, the terminals of the members of the clamps are designed to fit such bars C.

A headed stud 4 (Figs. 3 and 6) is pivoted to one of the members of the clamp 1 and permits the sleeves 5 to have a swinging movement. Threaded through each of the two sleeves 5, there being one to each side of the fender, is a rod 6, whose rear end extends through the slotted frame 7 and is thus limited in its up and down movement and is prevented from having lateral play. The slotted frame 7, as clearly shown in Fig. 4, is provided with an intermediate strip 8 and upon its face adjacent the chassis with the recesses 8'. The rear portion of the frame 7 is also provided with the vertical slot 7' through which the shank of the adjusting and fastening bolts 10 are disposed, so that the heads 9 thereof will pass between the respective strips 8 and the portions *a* of the heads 9 and engage the opposite recess 8' and abut with the clamping plate 11, to lock the slotted frame 7 to the frame.

A curved arm 12 is carried by each one of the slotted frames 7 at the front face thereof and to it is connected a coiled spring 13, whose other terminal is connected to the corresponding rod 6. By this means the two springs 13 resiliently hold both rods 6 in upward position, a screw 14 mounted in the upper end of each of the respective frames 7 limiting the upward movement of its rod 6.

The respective rods 6 are each provided with the downwardly extending arm 15 and each arm 15 is held in proper relation and against outward movement by means of the brace 16, the upper terminal of the brace 16 being adjustably connected to the arm 15.

Secured rigidly near the junction of the rods 6 and arms 15 and extending transversely of the frame C of the automobile, is a rod 17, set screws being provided to adjustably connect the parts in position so that frames of different widths may be accommodated.

The bail 19, which with the two terminals or arms 20 constitute the upper wing of the fender, is pivotally connected to the outer end of the rod 17 and is provided with the off set ends 21, said off set ends 21 constituting a means to limit the outward movement of the wing 19, as will presently appear, and also providing a means to attach one terminal of the coil spring 22, there being two of these springs, one to each arm 20. The other terminals of these springs 22 are connected to the enlarged or curved portion 23 of the respective guide plates 24 of the central or rigid frame of the fender, the sleeves 25 formed in the terminals of said arms 24 being rigidly connected to the rod 17 at points within the pivotal connection of the arms 20 thereto. The lower ends of the respective arms 24 are bridged by the rod 26, and upon this rod 26 are adjustably secured the collars 27 by means of the limiting sleeves 28. These collars 27 each carry a curved rod 29 which is slidably threaded through the enlarged lower end 30 of the respective arm 15. These curved rods 29 are limited in their outward movement by means of the cotter pins 32. The coiled springs 32′, one to each rod 29, resiliently cushion the rod 26. By this means a cushioning action is given the lower portion of the stationary frame, or more properly speaking the rod 26, so that when the fender strikes an obstruction, a resilient cushion will be afforded at this point, while the springs 13 will provide a means for resiliently holding the fender in proper supported position.

The lower wing of the fender, which is composed of the respective arms 36 and the connecting rod 37, has its arms 36 forked, as at 34, and secured to the lugs 33 of the arms 24 by means of the pins 34, the springs 22 thus providing a means to hold the upper wing 19 open while the lower wing is held open by gravity. The lower wing is limited in its open position by means of the forked ends 35 and the adjacent portion of the cross rod 26 of the stationary section, while the upper wing 19 is limited in its upward movement by means of the respective lugs 21 engaging adjacent portions of the stationary section.

The respective movable wings and stationary section are provided with a netting, and when in folded position, the upper section is placed upon the stationary wing and the lower wing is then collapsed to fit exteriorly of the upper wing, there being, as will presently appear, means for locking the wings in such position, the folding of the wings, places the springs 22 under tension, so that when the upper wing is released, the same being propelled by the springs, will cause the extension of the lower wing so that the complete fender is opened to receive any object falling thereagainst.

In order to lock the wings in the position shown in Fig. 2, and also provide a means for automatically releasing the same to assume the position shown in Fig. 1, a rod 38 is mounted for oscillation in the lugs 39 of the rods 6 near the junction thereof with the arms 15, and keyed upon the ends of said rod 38 are the two triggers 40—41, the trigger 40 having connected to its lower end a spring 42, which normally holds the hooked ends of both triggers in engagement with and upon the rod 37 of the lower wing of the fender. By this means the lower wing is locked at two points near its respective ends and there is less liability of the same becoming accidentally released so as to permit the springs 22 to elevate the free end of the upper wing 19 and consequently throw the lower wing to the position shown in Fig. 1, with the upper wing in open position also. In order to release the respective triggers 40—41, a flexible connection 43 is connected to the trigger 40 and is extended to any desired place within the automobile, so that the chauffeur or operator may, when occasion arises, pull upon the flexible connection 43 to simultaneously release both triggers and finally release the wings, which are thrown in open position to catch any object that may be endangered.

From the foregoing description, taken in connection with the drawings, it is evident that a fender or buffer constructed according to the present invention is provided with attaching means and other adjustments that will permit the ready attachment of the same to the forward portion of any chassis, the same being adjustable to chassis of various widths, while the securing devices are adjustable to any thickness of frame; and that when the device is in proper position, it will project downwardly below the down turned ends of the chassis and occupy such a small amount of space as to permit ready access to the crank of the engine when starting.

The present fender or guard when in folded position is so mounted as to protect the lamps against injury, and as before explained, when extended, provides a receptacle to catch the object falling thereagainst to prevent the passage of the object below the wheels and chassis of the machine.

What is claimed is:

1. A fender, having a stationary center wing, a lower wing swingingly connected to the center wing, an upper wing swingingly connected to the center wing, a spring for exerting a normal tension to open the upper wing, the lower and upper wings being mounted to fold one upon the other, and manually releasable means for locking the wings folded and against the tension of the spring.

2. The combination with means for adjustably connecting a fender to the forward portion of a chassis, of a fender having a stationary center wing supported by the connecting means, a lower wing swingingly connected to the center wing, an upper wing also swingingly connected to the center wing, a spring for moving the upper wing to open position, the lower and upper wings being mounted to collapse one upon the other, and manually releasable means for locking the wings foldable and against the tension of the spring.

3. A fender, having a stationary center wing, and an upper and a lower wing swingingly connected to the center wing and capable of moving toward and folding upon the center wing, a spring for throwing the upper and lower to open position, means for locking and releasing the swinging wings, and a transversely adjustable supporting member connected to the center wing.

4. A fender, having a stationary center wing, and an upper and a lower wing swingingly connected to the center wing and capable of folding toward and upon the center wing, a spring for throwing the swinging wings to open position, means for locking and releasing the swinging wings, a transversely adjustable supporting member connected to the center wing adjacent to the hinge of the upper swinging wing, and a resilient support between said supporting means and the portion of the center wing adjacent to the lower swinging wing.

5. A collapsible fender, having a stationary and two hinged wings, and a support for the fender connected to the stationary wing, and comprising two approximately right angled arms, two curved rods connected to the lower portion of the stationary wing and passed through the lower terminals of the right angled arms, a spring upon each curved rod to hold the lower portion of the wing away from the terminals of the right angled arm, and connecting members for securing the other two terminals of the right angled arms to a chassis.

6. A collapsible fender, having a stationary and two hinged wings, and a support for the fender connected to the stationary wing, and comprising two approximately right angled arms, two curved rods connected to the lower portion of the stationary wing and passed through the lower terminals of the right angled arms, a spring upon each curved rod to hold the lower portion of the wing away from the terminals of the right angled arm, two sets of clamps for connecting the fender to the chassis, a swivel connection between one set of clamps and the upper terminals of the right angled arms, and means for resiliently supporting and guiding the free ends of said terminals in the other set of clamps.

7. A collapsible fender, having a stationary and two hinged wings, the lower hinged wing being held open by gravity, a spring for holding the upper wing open, said upper wing being foldable upon the center wing with the lower wing folded upon the upper wing, the spring being distended, a support for the fender connected to the upper portion of the center wing, a rod mounted in said support to the rear of the connection thereof with the center wing, two hooks carried by said rod and disposed in the path to engage the lower wing to hold the wings folded, a spring for holding said hooks in such position, and manually operated means for releasing the hooks to permit the automatic opening of the upper and lower wings.

8. A collapsible fender, having a stationary and two hinged wings, the lower hinged wing having a normal tendency to open by gravity, a spring for holding the upper wing open, said upper wing being foldable upon the center wing with the lower wing folded upon the upper wing, the spring being distended, a support for the fender connected to the upper portion of the center wing, a rod mounted in said support to the rear of the connection thereof with the center wing, two hooks carried by said rod and disposed in the path to engage the lower wing to hold the wings collapsed, a spring for holding said hooks in such position, manually operated means for releasing the hooks to permit the automatic opening of the upper and lower wings, and means for adjustably and resiliently connecting the supporting member to a chassis.

9. The combination with a collapsible fender, of a support and means for connecting the same to a chassis, comprising two approximately right angled arms, means for bracing said arms against distortion, a pair of clamps for pivotally connecting to the angled portions of said arms to the chassis, means for guiding the free ends of said arms secured to the chassis, means for resiliently supporting the free ends of said arms to the last mentioned means, and a resilient support mounted in the other terminals of the right angled arms for holding the lower portion of the fender at an incline.

10. A fender, composed of three wings, the two outer wings being pivotally connected to the center section at opposite points, means for limiting the opening of the pivoted wings and to retain the same out of alinement with the center wing, said pivoted wings being disposed to fold one upon the other, springs connected to one of the pivoted wings and placed under tension when such wing is folded, spring actuated locking and releasing means for retaining the wings folded, and means manually releasing the locking means and the wings to the action of the springs.

11. A fender, composed of three wings, the two outer wings being pivotally connected to the center wing at opposite points, means for limiting the opening of the pivoted wings and to retain the same out of alinement with the center wing, said pivoted wings being disposed to fold one upon the other, springs connected to one of the pivoted wings and placed under tension when its wing is folded, spring actuated locking and releasing means for retaining the wings folded, manually operated means for releasing the lock and the wings to the action of the springs, and means for adjustably and resiliently connecting the fender to the chassis.

In testimony that I claim the foregoing as my own, I have hereto affixed my signature in the presence of two witnesses.

LEWIS R. FLINT.

Witnesses:
 LEO SABIN,
 HATTIE L. GORDON.

---

Copies of this patent may be obtained for five cents each, by addressing the "Commissioner of Patents, Washington, D. C."